US005672870A

United States Patent [19]

Flory et al.

[11] Patent Number: 5,672,870

[45] Date of Patent: Sep. 30, 1997

[54] MASS SELECTIVE NOTCH FILTER WITH QUADRUPOLE EXCISION FIELDS

[75] Inventors: Curt A. Flory, Los Altos; Stuart C. Hansen, Palo Alto; Carl Myerholtz, Cupertino, all of Calif.

[73] Assignee: Hewlett Packard Company, Palo Alto, Calif.

[21] Appl. No.: 573,703

[22] Filed: Dec. 18, 1995

[51] Int. Cl.[6] .................... B01D 59/44; H01J 49/00

[52] U.S. Cl. .................... 250/292; 250/282

[58] Field of Search .................... 250/281, 282, 250/292

[56] References Cited

U.S. PATENT DOCUMENTS

| | | | |
|---|---|---|---|
| 3,334,225 | 8/1967 | Langmuir | 250/292 |
| 4,535,236 | 8/1985 | Batey | 250/292 |
| 4,652,753 | 3/1987 | Shiokawa | 250/281 |
| 4,721,854 | 1/1988 | Dawson | 250/292 |
| 4,736,101 | 4/1988 | Syka et al. | 250/292 |
| 4,885,500 | 12/1989 | Hansen et al. | 313/256 |
| 5,089,703 | 2/1992 | Schoen et al. | 250/292 |
| 5,134,286 | 7/1992 | Kelly | 250/292 |
| 5,187,365 | 2/1993 | Kelley | 250/282 |
| 5,345,078 | 9/1994 | Kelley | 250/282 |
| 5,365,064 | 11/1994 | Rettinghaus | 250/305 |
| 5,449,905 | 9/1995 | Hoekman et al. | 250/292 |
| 5,468,957 | 11/1995 | Franzen | 250/292 |
| 5,598,001 | 1/1997 | Flory et al. | 250/292 |

OTHER PUBLICATIONS

Reinsfelder et al., "Theory and Characterization of a Separator Analyzer Mass Spectrometer", 1981, vol. 37, pp. 241–250, International Journal of Mass Spectrometry and Ion Physics.

Miller et al., "A Notch Rejection Quadrupole Mass Filter", 1990, vol. 96, pp. 17–26, International Journal of Mass Spectrometry and Ion Processes.

*Primary Examiner*—Bruce Anderson
*Attorney, Agent, or Firm*—Philip S. Yip

[57] ABSTRACT

A notch filter for selectively removing a target ion with a specific mass-to-charge ratio from an ion beam is provided. The notch filter uses a quadrupole and a power supply for generating an rf electrical potential in the quadrupole. The quadrupole has two pairs of parallel electrodes of opposite polarities. Each pair is comprised of two parallel electrodes having equal electrical potential. The rf electrical potential generated by the power supply is a superposition of an rf quadrupole frequency component and an excision frequency component. The quadrupole has an inlet end and an outlet end and the ion beam traverses from the inlet end to the outlet end. As a result of the rf quadrupole frequency component, ions of above a selected mass-to-charge ratio are guided down the quadrupole. The excision frequency component, which is at the second harmonic of the dominant resonant frequency of the target ion, causes the target ion to resonate and be removed from the ion beam before exiting the quadrupole.

15 Claims, 12 Drawing Sheets

MASS SELECTIVE NOTCH FILTER WITH QUADRUPOLE EXCISION FIELDS

FIELD OF THE INVENTION

The present invention relates to mass filters, more particularly quadrupole mass filters for eliminating ions of a specific mass-to-charge ratio.

BACKGROUND

Mass spectrometry (MS) is a useful analytic technique for identification of chemical structures, determination of components of mixtures, and quantitative elemental analysis. This analytical technique is based on the separation of the ionized components of an analyte by their mass-to-charge ratios. Often, in either the collection or ionization stage of a sample for analysis, an undesired species can contaminate the sample to a very high level. Examples of contaminants include the background helium carder gas when using a gas chromatograph column as the input to the mass spectrometer and the residual argon gas found in samples obtained from inductively coupled plasma (ICP) sources. Thus, a mass filter that can selectively eliminate ions of a predetermined mass-to-charge ratio from an ion beam but fully transmit all other ions is desirable.

To this end, filters have been inserted into the path of an ion beam to remove target ions (such as a contaminant, or undesirable ion) of a specified mass-to-charge ratio while transmitting other ions. Preferably, the filter transmission function has a notch only one atomic mass unit wide to allow rejection of a single ion species. Such filters, made by using quadrupoles, have been reported in the literature.

A quadrupole filter is a device in which ions travel along an axis parallel to and centered between four parallel quadrupole rods connected to voltage sources (e.g., described in U.S. Pat. No. 3,334,225 (Langmuir) and U.S. Pat. No. 5,187,365 (Kelley)). FIG. 1 shows a typical quadrupole 10, which has four parallel, straight, (i.e., linear), elongated electrodes (or rods) 12, 14, 16, 18 connected to an oscillating voltage supply 20 that supplies a radio frequency (rf) oscillating voltage (hereinafter referred to as the "rf quadrupole voltage") to the electrodes. A pair of oppositely facing electrodes 12, 16 are connected to one pole and the other pair of oppositely facing electrodes 14, 18 are connected to the other pole of the oscillating voltage supply 20. The oscillating rf quadrupole voltage guides ions between the electrodes via well-known effective forces. (The rf frequency of this rf quadrupole voltage is referred to as the "rf quadrupole frequency" hereinafter.)

As known in the art, to filter out an unwanted contaminant ion, a dipole field "excision" frequency is selected to correspond to the specific frequency of transverse motion that the contaminant ion exhibits as it is guided down the quadrupole by the effective potential generated by the rf quadrupole voltage. This dipolar excision voltage (having a lower frequency than the rf quadrupole frequency) would coherently act to increase the transverse motion amplitude of the contaminant ion as the ion traverses down the quadrupole. Eventually, the transverse motion amplitude becomes so large that the ion strikes the quadrupole structure and is eliminated from the ion beam. Other ions with different mass-to-charge ratios, due to their lack of synchronism with the excision frequency, would not increase their amplitudes in transverse motion significantly. In this manner, mass selectivity is achieved.

Thus, a notch filter is realized by operating a quadrupole in a rf-quadrupole-frequency-only configuration (i.e., no DC voltage, in which case the quadrupole acts effectively as an "ion pipe") and applying an oscillating dipole field of a lower frequency than the rf quadrupole frequency to an opposing pair of the four quadrupole rods. Examples are found in Reinsfelder et al., "Theory and Characterization of a Separator Analyzer Mass Spectrometer," Int. J. Mass Spec. and Ion Physics, 37: 241–250 (1981) and Miller et al.,"A Notch Rejection Quadrupole Mass Filter," Int. J. Mass Spec. and Ion Physics, 96: 17–26 (1990).

A difficulty encountered in such dipolar excision systems is that the lower frequency dipolar excision field (hereinafter "dipole field"), which must be applied to a single pair of the four quadrupole rods, can only be implemented in a cumbersome electronic coupling network. The reason such an electronic coupling network is needed is that the higher frequency (rf quadrupole) voltage is applied to the quadrupole electrodes such that adjacent electrodes have opposite polarities, but to generate the dipole field, the lower frequency excision voltage is applied such that two oppositely facing electrodes have opposite polarities. An example of such an electronic coupling network is described in "A Notch Rejection Quadrupole Mass Filter," Miller et al., supra (see FIG. 5 of Miller et at.). Such coupling networks require an additional radio frequency transformer to provide a means to electrically isolate a single pair of rods out of the two pairs of quadrupole rods. The low frequency excision voltage is coupled via a primary winding on this transformer. This scheme also requires the use of various radio frequency chokes and capacitors to block the excision voltage source from being influenced by the high frequency quadrupole drive circuit, and vice versa.

The present invention overcomes these disadvantages by providing a quadrupole notch filter that does not require the cumbersome isolation coupling networks in the prior art.

SUMMARY

The present invention provides a notch filter for selectively removing a target ion with a specific mass-to-charge ratio from an ion beam (e.g., a beam that contains a mixture of ions). This notch filter has a quadrupole and a power supply that drives the electrical potential in the quadrupole. The quadrupole has two pairs of parallel electrodes, each pair having an oscillating electrical potential opposite in polarity to the other pair. In each pair, the two parallel electrodes have the same oscillating electrical potential. The quadrupole has an inlet end and an outlet end and the ion beam is directed to traverse from the inlet end to the outlet end. The power supply generates an oscillating electrical potential which is a superposition of (i.e., containing) an rf quadrupole frequency component and an excision frequency component. Oscillation of the electrical potential at the electrodes results in an effective force that affects the movement of ions in the ion beam. The effective force generated by the rf quadrupole voltage guides ions above a selected mass-to-charge ratio along the quadrupole from the inlet end to the outlet end. The excision voltage causes the target ion to resonate and be removed from the ion beam before exiting the quadrupole, thus creating a "notch" or "rejection window" in the mass filter response.

The present invention also provides a method for removing unwanted target ions from an ion beam and a method of making a quadrupole notch filter that can accomplish such elimination of unwanted target ions.

A conventional quadrupole, with a rf quadrupole voltage applied to the electrodes, acts as a high-pass mass filter (i.e., it allows ions of above a selected mass-to-charge ratio to pass while eliminating ions below that selected ratio). This selected ratio (or "cut-off" ratio) is determined by the frequency and the amplitude of the rf quadrupole voltage applied. When the cut-off ratio is selected to be below the lowest mass-to-charge ratio of interest in the ion beam, the quadrupole acts as a simple "ion pipe." The ions are guided down (or along) the quadrupole electrodes by an "effective potential" (which is generated by the rf quadrupole voltage and is directed toward the quadrupole centerline (along the axis)). The ions therefore travel down the axis of the quadrupole with transverse oscillations generated by the restoring forces of the effective potential. Such "bouncing" paths are effectively harmonic.

For a particular ion, the effective potential is dependent partly on the mass-to-charge ratio of the ion traversing the quadrupole. As the ion (with a specific mass-to-charge ratio) moves down the quadrupole under the influence of the rf effective potential, it undergoes harmonic motion, hereafter called macromotion, in the transverse direction at a specific macromotion frequency. To eliminate a target ion according to the present invention, by applying an additional harmonic voltage (hereafter called the excision voltage) to the quadrupole at an excision frequency equal to twice the "macromotion" frequency, an oscillating electric field is created to provide a force that coherently causes the ion's macromotion to grow rapidly until the ion strikes an electrode. At the electrode, the ion is neutralized and thereby is eliminated from the ion beam. Ions with different macromotion frequencies are not significantly affected by the excision voltage because the excision field does not act coherently to alternately accelerate and decelerate the transverse macromotion of these ions.

The notch filter of the present invention has several advantages over the conventional notch filters with a dipole field. For example, the present notch filter is more efficient because it provides an excision field in both transverse dimensions, rather than in a single dimension as in the dipolar notch filters. With the present invention, notches can be placed at one or more selected masses with, for example, one amu width. Transmission suppression in a target notch can be set to allow less than $10^{-3}$ of transmission outside the notch. The notch filter can allow full transmission (if not within other filtered ranges) outside the notch.

Further, the electrical circuitry of the present notch filter can be much simpler than the conventional notch filters that use a dipole field. Since both the excision frequency and the rf quadrupole frequency are applied on the same electrodes, no bulky, cumbersome frequency isolation electronic coupling network is needed to isolate the nonexcision electrodes from the excision electrodes. In fact, the four quadrupole electrodes can be electrically connected in the usual way as in a mass filter or ion pipe. This simplicity in circuitry is particularly beneficial if more than one notch is desired. In contrast, a multiple-frequency isolation electronic coupling network is needed if multiple notches are to be implemented in conventional systems, rendering such systems more complex.

This invention also allows the number of high voltage connections and vacuum chamber feedthroughs to be reduced because the third feedthrough required in the circuit of the prior art systems (e.g., as shown in FIG. 5 of Miller et al., supra) is eliminated. In addition, the number of high frequency components is reduced and, consequently, the resulting circuitry of the present invention is inherently less susceptible to tuning changes (drift) with temperature changes. All of the signal processing can be done at low impedance and voltage levels on the outside of the vacuum chamber, e.g., at the input of a quadrupole power amplifier of sufficient bandwidth to accommodate the excision and rf quadrupole frequencies. A low level excision voltage can be summed with the much higher rf quadrupole voltage at the power amplifier input to apply both (rf quadrupole and excision) frequencies at different voltage levels to the four quadrupole electrodes as conventionally connected pairs.

BRIEF DESCRIPTION OF THE DRAWINGS

The following figures which show the embodiments of the present invention are included to better illustrate the present invention. In these figures, like numerals represent like features in the several views.

DETAILED DESCRIPTION OF THE PREFERRED EMBODIMENTS

This invention applies both a low frequency excision voltage and a high frequency rf quadrupole voltage to two pairs of quadrupole rods (or electrodes). Notch filtration is achieved by the linear superposition of the two quadrupolar connection oscillation signals at the quadrupole electrodes.

Ion Motion Caused by rf Voltage on Quadrupole

Figure 1:
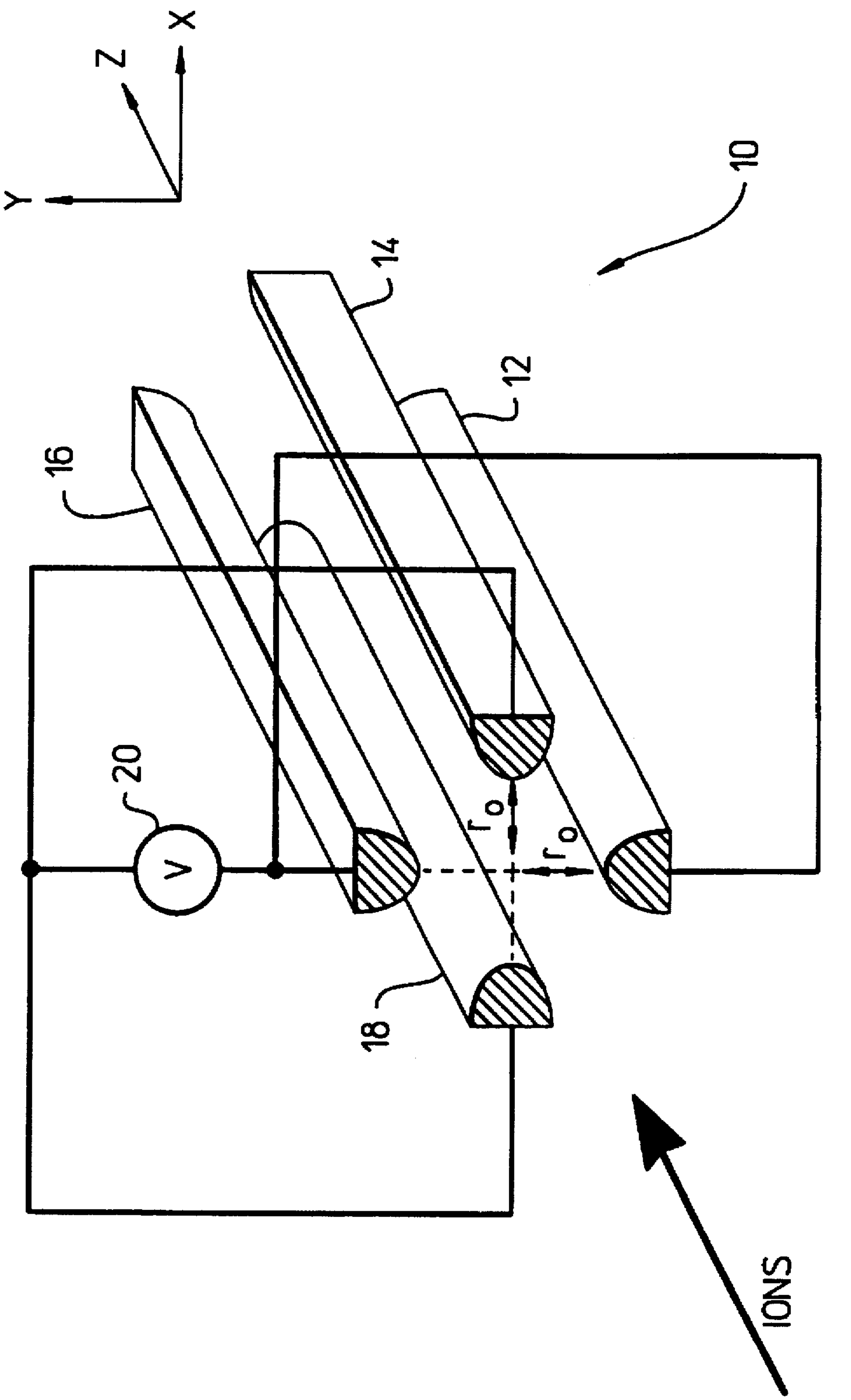
FIG. 1 (PRIOR ART)
FIG. 1 is a schematic representation of a prior art quadrupole.

The following provides a brief theoretical description relating to ion motion in a quadrupole. For the quadrupole structure depicted in FIG. 1, in an x, y, z Cartesian coordinate system, the electrical potential in the dimensions transverse to the z-axis has the form $$\Phi = \frac{\Phi_0}{r_0^2}(x^2 - y^2) \qquad (1)$$

where $r_0$ is the distance from the quadrupole center axis to the nearest point on an electrode, and $\Phi_0$ is the applied voltage. Since the potential is invariant along the z-axis, the forces felt by an ion traveling along the quadrupole axis are only in the transverse dimensions. These forces are given by $$F = -e\nabla\Phi \qquad (2)$$

where e is the charge on the ion. For an ion with mass m, equation (2) in Cartesian coordinates has the form $$m\frac{d^2x}{dt^2} = -e\frac{\partial\Phi}{\partial x} = -\frac{2e\Phi_0}{r_0^2}x \qquad (3)$$

$$m\frac{d^2y}{dt^2} = -e\frac{\partial\Phi}{\partial y} = \frac{2e\Phi_0}{r_0^2}y. \qquad (4)$$

For an applied potential (i.e., voltage) of $$\Phi_0 = U - V\cos\Omega 0283 \qquad (5)$$

where Φ is the angular velocity, U is the DC (direct current) component, and V is the amplitude of the AC (alternating current) component, the equations of motion for the transverse dimensions become $$\frac{d^2x}{dt^2} + \frac{2e}{mr_0^2}(U - V\cos\Omega t)x = 0 \qquad (6)$$

$$\frac{d^2y}{dt^2} - \frac{2e}{mr_0^2}(U - V\cos\Omega t)y = 0. \qquad (7)$$

Making the appropriate definitions and scaling the time variable allow these expressions to be written in the Mathieu equation canonical form $$\frac{d^2x}{d\xi^2} + (a - 2q\cos 2\xi)x = 0 \qquad (8)$$

$$\frac{d^2y}{d\xi^2} - (a - 2q\cos 2\xi)y = 0 \qquad (9)$$

where $$a = \frac{8e}{mr_0^2\Omega^2}U,\; q = \frac{4e}{mr_0^2\Omega^2}V,\text{ and } \xi = \frac{\Omega t}{2}.$$

Figure 2:
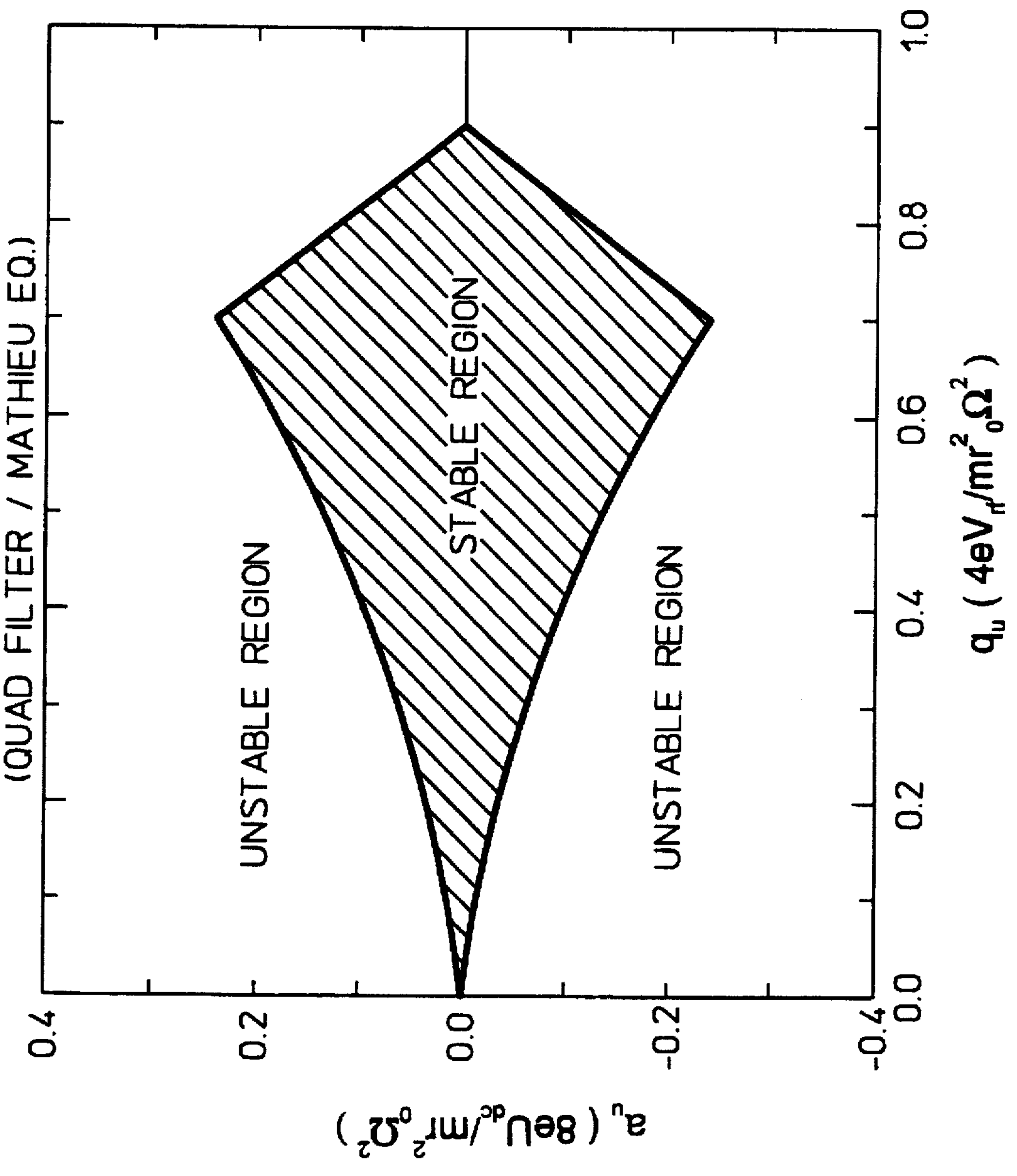
FIG. 2 is a graphical representation of the stability diagram of a quadrupole based on the Mathieu Equation.
Figure 3A:
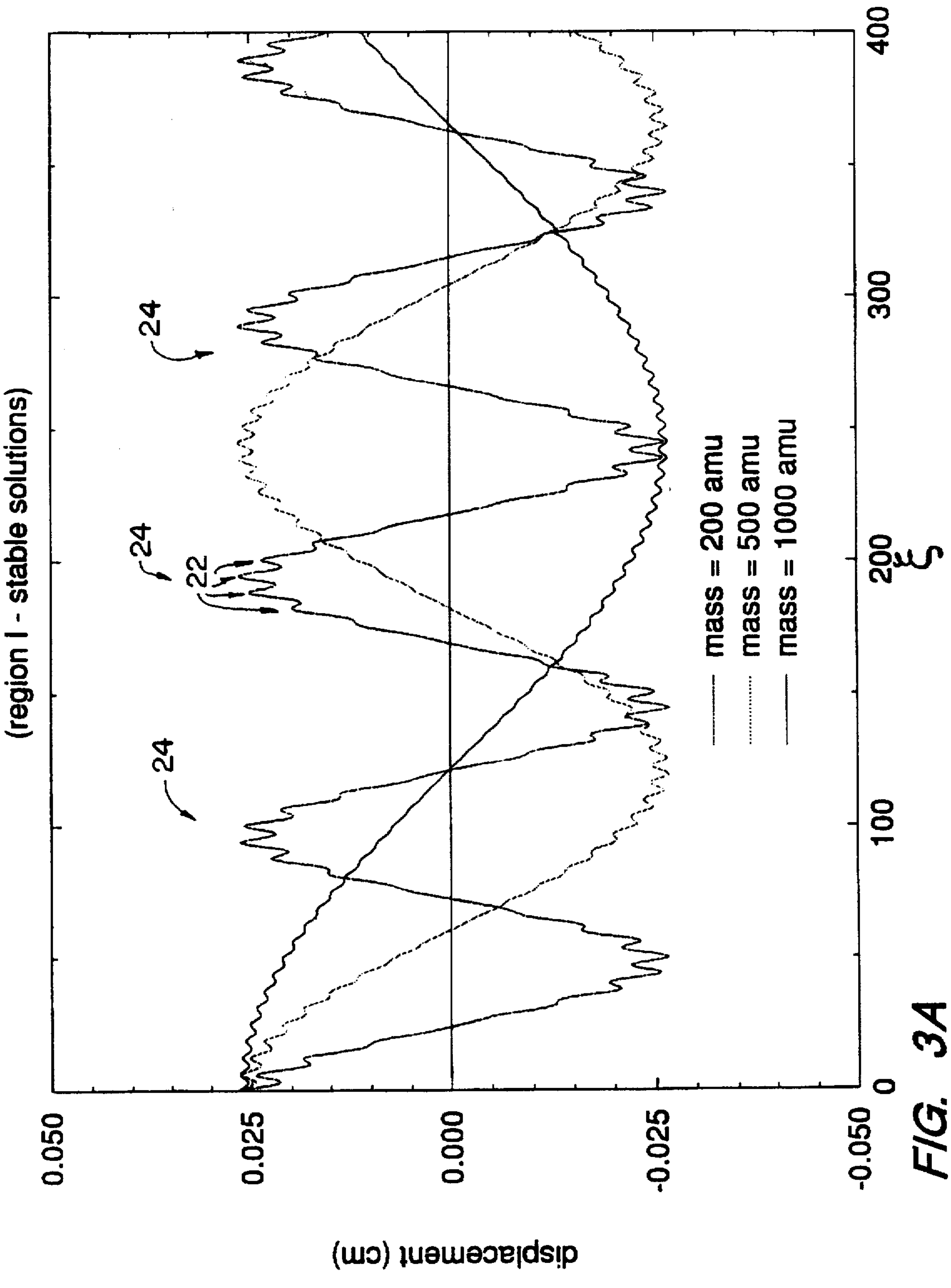
FIG. 3A is a graphical representation of the micromotion (22) and the macromotion (24) of ions of various masses (200 amu, 500 amu, 1000 amu) in a quadrupole in the stable region of FIG. 2.
Figure 3B:
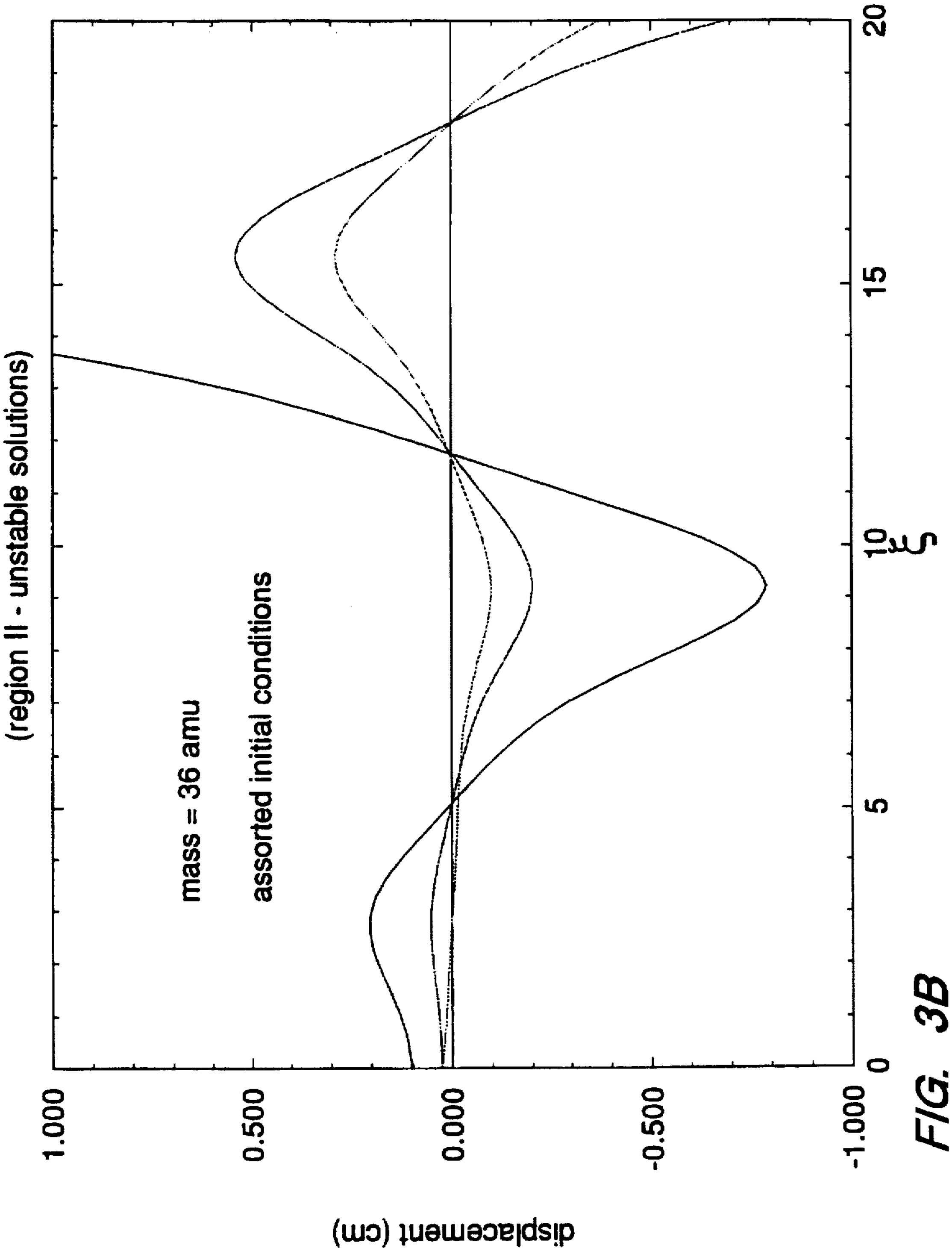
FIG. 3B is a graphical representation of the macromotion of ions of 36 amu in the unstable region of FIG. 2 under various initial conditions.

The Mathieu equation is well understood, and the solutions can be qualitatively analyzed by inspection of the standard stability diagram shown in FIG. 2. For the parameters a and q in the "stable region," the solutions to the Mathieu equation are finite, and are quasi-periodic in the time (or ξ) variable. For parameters lying outside this stable region, the solutions grow exponentially with time (or ξ), and are thus deemed unstable. FIGS. 3A and 3B show examples of numerically integrated solutions of the Mathieu equation for sets of parameters in the stable and unstable regions, respectively.

If the DC voltage is set to equal zero (U=0, then a=0) and the rf voltage is at a given nonzero amplitude and frequency, the stability of an ion's motion in the quadrupole depends on its mass-to-charge ratio. Since the parameter q varies as 1/m, all ions with masses below a "mass cut-off" (selected mass-to-charge ratio, which depends on the actual values of V and Ω) follow an unstable trajectory, and all ions with masses above the mass cut-off follow stable quasi-periodic trajectories.

If the parameters are chosen appropriately, i.e., with adequately low mass cut-off, a quadrupole operated with only a single applied rf voltage allows all ions that have a mass above a certain mass cut-off to pass through. In this way, as previously mentioned, it acts as a simple "ion pipe" for all ions with mass-to-charge ratios greater than the mass cut-off.

The quantitative behavior of the stable solutions to the Mathieu equation can be analyzed in the following way. The nonlinear nature of the interaction as dictated by the Mathieu equation generates a "static" effective potential for the ions by virtue of the small amplitude response of the ions to the rapid rf quadrupole field changes, hereinafter referred to as the "micromotion," and by the phase relationship to the applied rf quadrupole voltage. This "static" effective potential is what guides the ions down the axis of the quadrupole and causes the ions to undergo a much larger, slower "macromotion" oscillation superimposed upon the small, rapid micromotion generated by the applied rf quadrupole voltage. The frequency of this macromotion is calculable for an ion and depends on the amplitude and frequency of the applied rf quadrupole voltage and the ion's mass-to-charge ratio. The numerically integrated trajectories shown in FIG. 3A illustrate examples of the slow, large-amplitude macromotion (having peaks 24, etc. due to the effective potential) superimposed upon the more rapid, smaller-amplitude micromotion (having peaks 22, etc.).

The stable solutions (trajectories) of the Mathieu equation as written above, in the approximation of the micromotion amplitude being much smaller than the macromotion amplitude, and averaging over time scales on the order of an rf period, have a transverse motion governed by the set of dynamical equations:

$$\frac{d^2x}{d\xi^2} + \left(a + \frac{q^2}{2}\right)x = 0 \qquad (10)$$

$$\frac{d^2y}{d\xi^2} + \left(-a + \frac{q^2}{2}\right)y = 0. \qquad (11)$$

For rf-quadrupole-frequency-only operation (a=0), the dynamical equations are simple harmonic in both transverse dimensions $$\frac{d^2x}{d\xi^2} + \frac{q^2}{2}x = 0 \qquad (12)$$

$$\frac{d^2y}{d\xi^2} + \frac{q^2}{2}y = 0. \qquad (13)$$

These equations show that the ions are guided along the quadrupole z-axis by an effective potential that exhibits a static linear restoring force toward the neutral position at zero offset.

From the above equations and the previous definitions of $\epsilon$ and q, the macromotion frequency (angular velocity) can be shown to be $$\omega_0 = \frac{q\Omega}{2\sqrt{2}} = \frac{\sqrt{2}\,e}{mr_0^2\Omega}V. \qquad (14)$$

In the above approximation, the macromotion is purely harmonic (sinusoidal) for a specific rf quadrupole voltage V and a rf quadrupole frequency Ω. The macromotion frequency varies as 1/m.

Preferred Embodiments of Quadrupole Notch Filter

Figure 4:
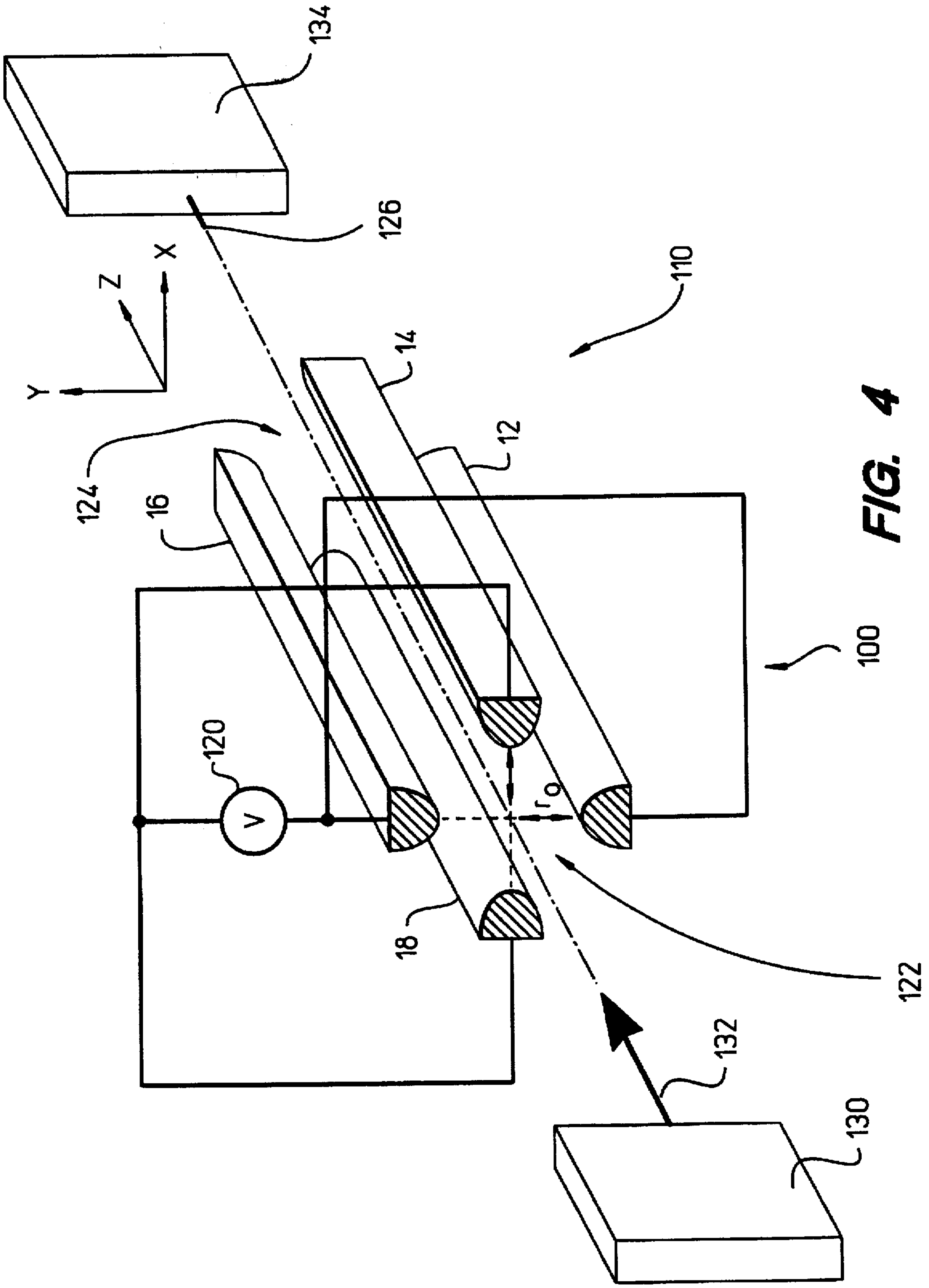
FIG. 4 is a schematic representation of an embodiment of the quadrupole notch filter of the present invention.

FIG. 4 shows an illustrative embodiment of the quadrupole notch filter 100 of the present invention. This quadrupole notch filter 100 can be used for selectively removing a target ion with a specific mass-to-charge ratio from an ion beam. The quadrupole notch filter 100 includes a quadrupole electrode assembly 110 having two pairs of linear, parallel electrodes (or rods) adapted to have opposite polarities. Oppositely facing electrodes 12 and 16 are electrically connected together such that there is no substantial impedance between them. Likewise, electrodes 14 and 18 are electrically connected together.

An oscillating voltage (or power) supply (OVS) 120 drives the oscillation in electrical potential of the quadrupole electrode assembly 110. Oppositely facing electrodes 12, 16 are connected to one pole of the OVS 120 and oppositely facing electrodes 14, 18 are connected to the other pole of the OVS. The OVS 120 generates an oscillating electrical potential which is a superposition of a rf quadrupole frequency component and an excision frequency component. The excision frequency is lower than the rf quadrupole frequency. The quadrupole electrode assembly 110 has an inlet end 122 and an outlet end 124. The beam path 126 of the ion beam extends from the inlet end 122 to the outlet end 124 of the quadrupole electrode assembly 110. As the electrical potential of electrodes 12, 14, 16, 18 oscillate, the effective potential generated by the rf quadrupole field causes ions above a selected mass-to-charge ratio (i.e., a "mass cut-off" ratio) to be guided down the quadrupole electrode assembly. The lower frequency excision field causes the target ion to resonate and impact one of the electrodes 12, 14, 16, 18 before exiting the quadrupole notch filter 100.

In an assembly in which the quadrupole notch filter of the present invention is used for removing a target ion from an ion beam, the notch filter can further include an ion source 130 for emitting an ion beam (i.e., beam of ions) 132 into the quadrupole electrode assembly 110. Additionally, a detector 134 can be used for detecting the ions exiting the quadrupole electrode assembly 110. Ion sources and detectors suitable for such applications are known in the art.

Figure 5:
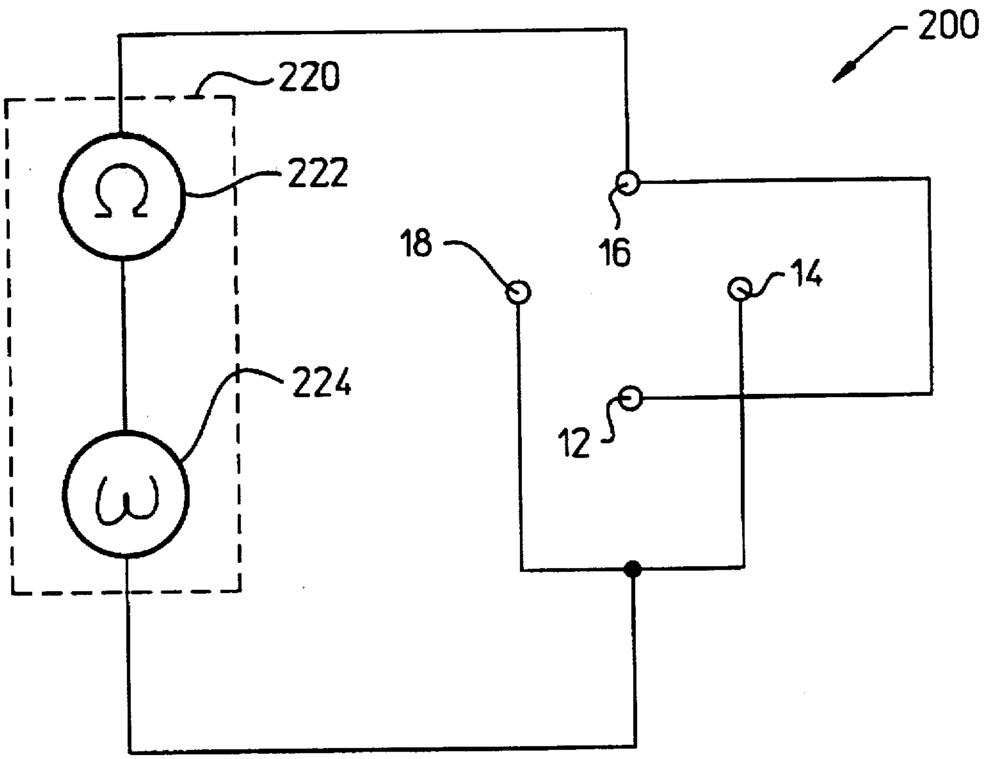
FIG. 5 is a schematic representation showing the power supply of FIG. 4 having two oscillators.

FIG. 5 shows a schematic representation of the voltage supply 120 of the embodiment shown in FIG. 4 in further detail. The voltage supply 120 includes two oscillators 222, 224. The oscillator 222 provides the higher rf quadrupole frequency Ω and the oscillator 224 provides the lower excision frequency ω, which is superimposed on the rf quadrupole frequency (Ω and ω are angular frequencies). It is also contemplated that the voltage supply 120 has a single oscillator that can generate a waveform with both the rf quadrupole frequency Ω and the excision frequency ω components.

Figure 6:
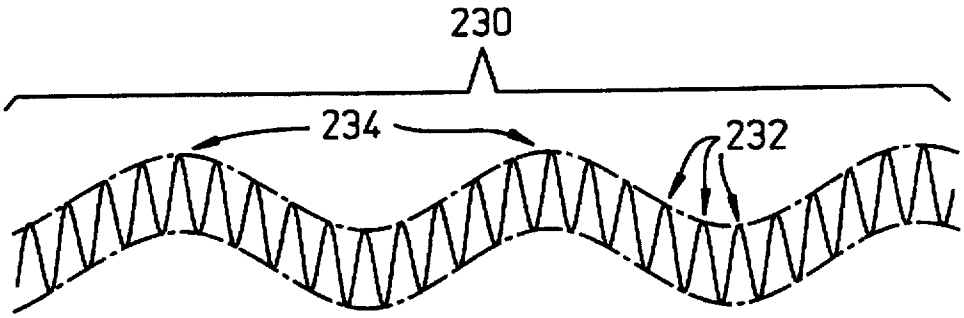
FIG. 6 is a graphical representation of the voltage as applied between two adjacent electrodes in the notch filter of the present invention.

FIG. 6 shows the wave-form of the oscillating electrical potential on the electrodes 12, 14, 16, 18. The wave 230 has high frequency peaks 232 caused by the higher frequency rf quadrupole voltage and low frequency peaks 234 caused by the lower frequency excision voltage. Electrodes, voltage supplies, oscillators, ion sources, and detectors suitable for use in quadrupoles and notch filters are known in the art (e.g., those described by Miller et at., supra, and Reinsfelder et al., supra, whose descriptions of quadrupole filter structures and the operation of the structures are incorporated by reference herein).

Application of the Excision Fields

The quadrupole notch falter is operated to have the electrical potential of the electrodes oscillating at a selected rf quadrupole frequency Ω such that ions with a mass-to-charge ratio greater than a selected "mass cut-off" will be guided down the quadrupole (i.e., from the inlet end toward the outlet end). According to the present invention, the oscillator further drives the electrodes to oscillate with an excision voltage of frequency ω superimposed on the rf quadrupole voltage of frequency Ω. The excision frequency is selected to be the second harmonic of the macromotion frequency (i.e., the dominant resonant frequency of the ion in response to the effective potential) of the target ion to be excised (removed from the ion beam).

Figure 7:
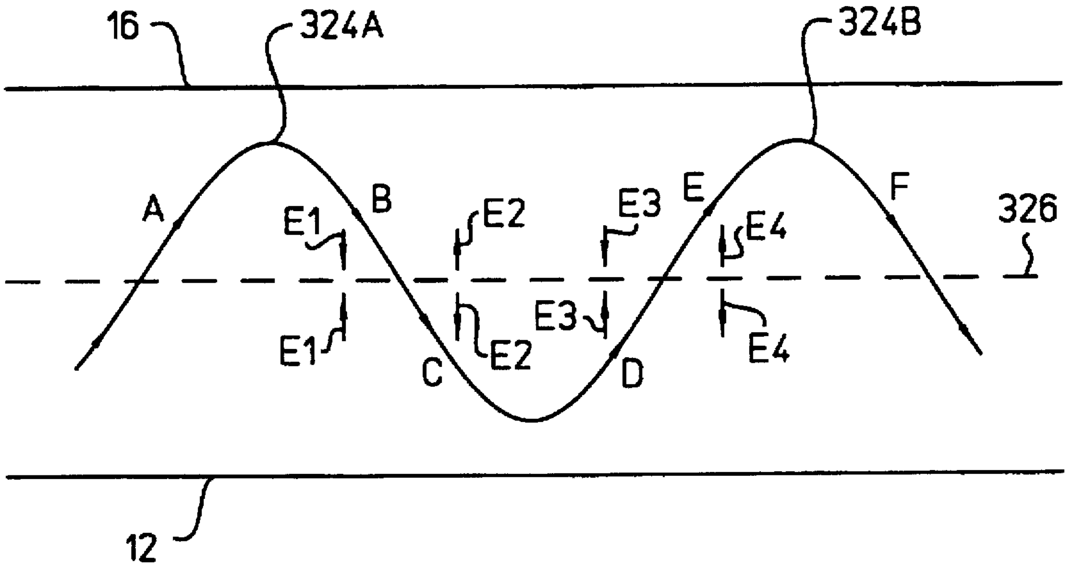
FIG. 7 is a schematic representation of the macromotion and the driving forces caused by the excision voltage in an embodiment of the notch filter of the present invention.

FIG. 7 is a schematic representation of the motion of an ion as it traverses down the quadrupole assembly. The excision field generates a force that, depending on the ion's location in the quadrupole, is either with or against the instantaneous transverse macromotion. As shown in FIG. 7, peaks 324A and 324B are peaks of the path (represented by curve ABCDEF) traversed by an ion due to the macromotion caused by the effective potential generated by the rf quadrupole voltage. E1, E2, E3, E4, etc. are arrows representing the directions of forces caused by the electric fields resulting from the excision voltage. In FIG. 7, at portion B of the path (where the ion's macromotion has a transverse component towards the mid-plane (represent by line 326) between oppositely facing electrodes 12, 16), the excision voltage is in a phase relative to the macromotion such that it generates an electric field (resulting in forces represented by arrows E1) that drives the ion in the direction of the ion's instantaneous transverse macromotion. Therefore, at portion B, the ion's instantaneous transverse macromotion (away from electrode 16 towards the mid-plane) is further increased (or augmented) by the excision field.

At portion C of the macromotion path, the ion has passed the mid-plane (line 326). The macromotion of the ion continues towards electrode 12. The excision field generates forces (represented by arrows E2) that further drive the ion in the direction (i.e., towards electrode 12) of the transverse component of the instantaneous macromotion, further increasing the amplitude of the transverse macromotion.

Once the macromotion reverses direction (at portion D of the path), the phase of the excision field has advanced such that the electric field has reversed direction, causing the forces to continue to be in synchronism with the ion macromotion, to further build up the transverse amplitude. Thus, at portion D, the instantaneous transverse macromotion (away from electrode 12 towards the mid-plane (line 326)) is again reinforced by the excision field.

In this way, by using an excision frequency that is twice the macromotion frequency of the ion to be excised, the excision field reinforces (is in synchronism with) the diverging (transverse) component of the ion's macromotion, causing this transverse macromotion to grow. When the amplitude of the transverse macromotion becomes large enough, before the ion can exit the quadrupole, it will strike one of the electrodes (e.g., electrode 12 or 16) and be eliminated from the ion beam. In other words, as the target ion develops a coherent macromotion and completes each half cycle to arrive at the mid-plane, the applied excision fields generated by the oppositely facing electrodes will have completed a full cycle and reversed in direction, thereby continuing the acceleration and amplitude growth in the transverse macromotion for an ion with the specific mass-to-charge ratio.

An additional feature of the present invention is that a resonant ion's macromotion amplitude is driven in both transverse directions by the two pairs of electrodes (i.e., two dimensionally in the x-y plane) with the application of the excision field in the quadrupole. Thus, the present excision process is more efficient than using a dipole field, which induces transverse amplitude growth in only one dimension.

The present invention affords significant advantages over prior art notch filters. In conventional systems, the excision field consists of an rf voltage applied across a single pair of opposing electrodes, creating an electric field (which is dipolar) along the length of the quadrupole electrodes. The dipolar excision field is selected to vary at a frequency that matches the macromotion frequency of a target ion. The target ion thus oscillates in phase with the additional driving field. Using this excision frequency, the target ion is driven from the ion beam. To compare with the present invention, this prior art process is shown by arrows F1 and F2 in FIG. 8. The arrows F1, F2, etc. represent the directions of forces caused by the dipole field (between electrodes 12 and 16). At portions B and C of the macromotion path, the driving force (represented by Arrow F1) from the electric field generated by the excision voltage drives the ion away from electrode 16 towards electrode 12, regardless of which side of the midplane 326 the ion is located. At portions D and E of the macromotion path, the electric field generated by the dipolar excision voltage now results in forces (represented by arrow F2) having a direction opposite to arrow F1, which reinforces the macromotion.

Although the prior art dipolar scheme can remove target ions, it has shortcomings. The difficulty of imposing a dipolar excision voltage across opposing electrodes while maintaining a higher frequency rf quadrupole voltage across adjacent electrodes makes it desirable to add the excision voltage directly to the rf quadrupole voltage as in the present invention. However, we have found that, referring to FIG. 8, such an application on the quadrupole electrodes will not function if the excision frequency is the same as the macromotion frequency (as is done conventionally in systems with a dipole field).

Figure 8:
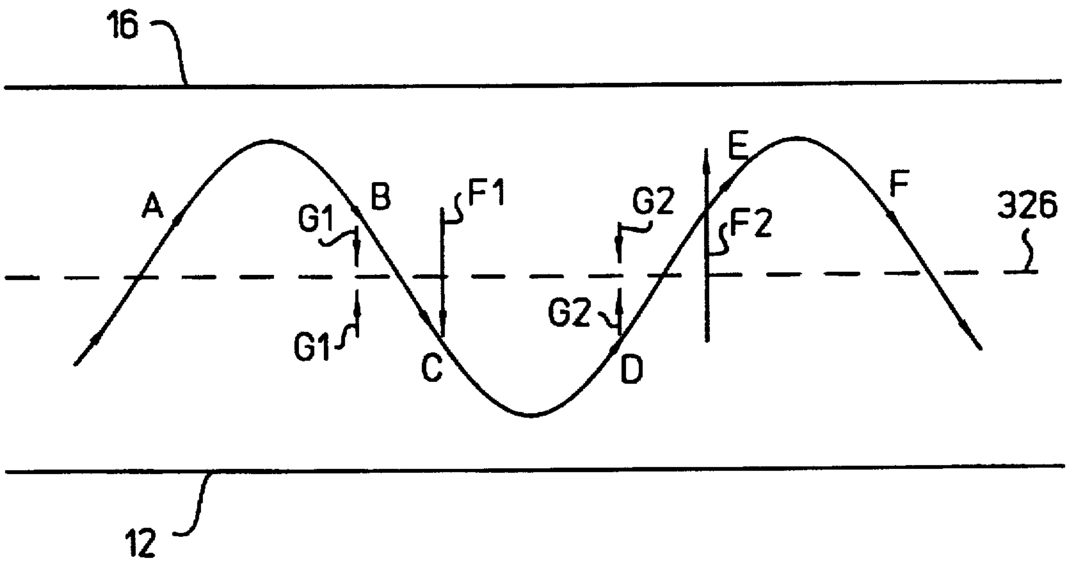
FIG. 8 is a schematic representation of the macromotion and the driving forces caused by the excision voltage in a dipole field.

In FIG. 8, if the excision field is applied across adjacent electrodes 12, 14 and across electrodes 16, 18 instead of across oppositely facing electrodes 12, 16, the excision field in phase B of the macromotion ion path results in forces (represented by arrows G1) that point in opposite directions on the two sides of the mid-plane (represented by line 326). On the side of the mid-plane closer to electrode 16, these forces reinforce the transverse component of the macromotion. However, after the ion has passed the mid-plane (represented by line 326) the ion is decelerated by the excision field, because the electric field remains in the same orientation and tends to drive the ion back toward the mid-plane. This deceleration also takes place due to the forces G2 at portions D and E (as well as further down the quadrupole). Therefore, a scheme that is effective with a dipole field across oppositely facing electrodes (e.g. electrodes 12, 16) is inoperative when applied as a quadrupole field on all four electrodes 12, 14, 16, 18.

The actual operation of a mass selective notch filter (MSNF) according to the present invention can be simulated using a computer program. To simulate the effect of the application of an excision field, a term $V^{ex}$ is added to the ion equations of motion, resulting in:

$$\frac{d^2x}{dt^2}+\frac{2e}{mr_0^2}(U-V\cos\Omega t)\,x=\frac{2eV^{ex}}{mr_0^2}\cos(2\omega_0 t)\,x \tag{15}$$

$$\frac{d^2y}{dt^2}+\frac{2e}{mr_0^2}(U-V\cos\Omega t)\,y=\frac{2eV^{ex}}{mr_0^2}\cos(2\omega_0 t)\,y. \tag{16}$$

Figure 9:
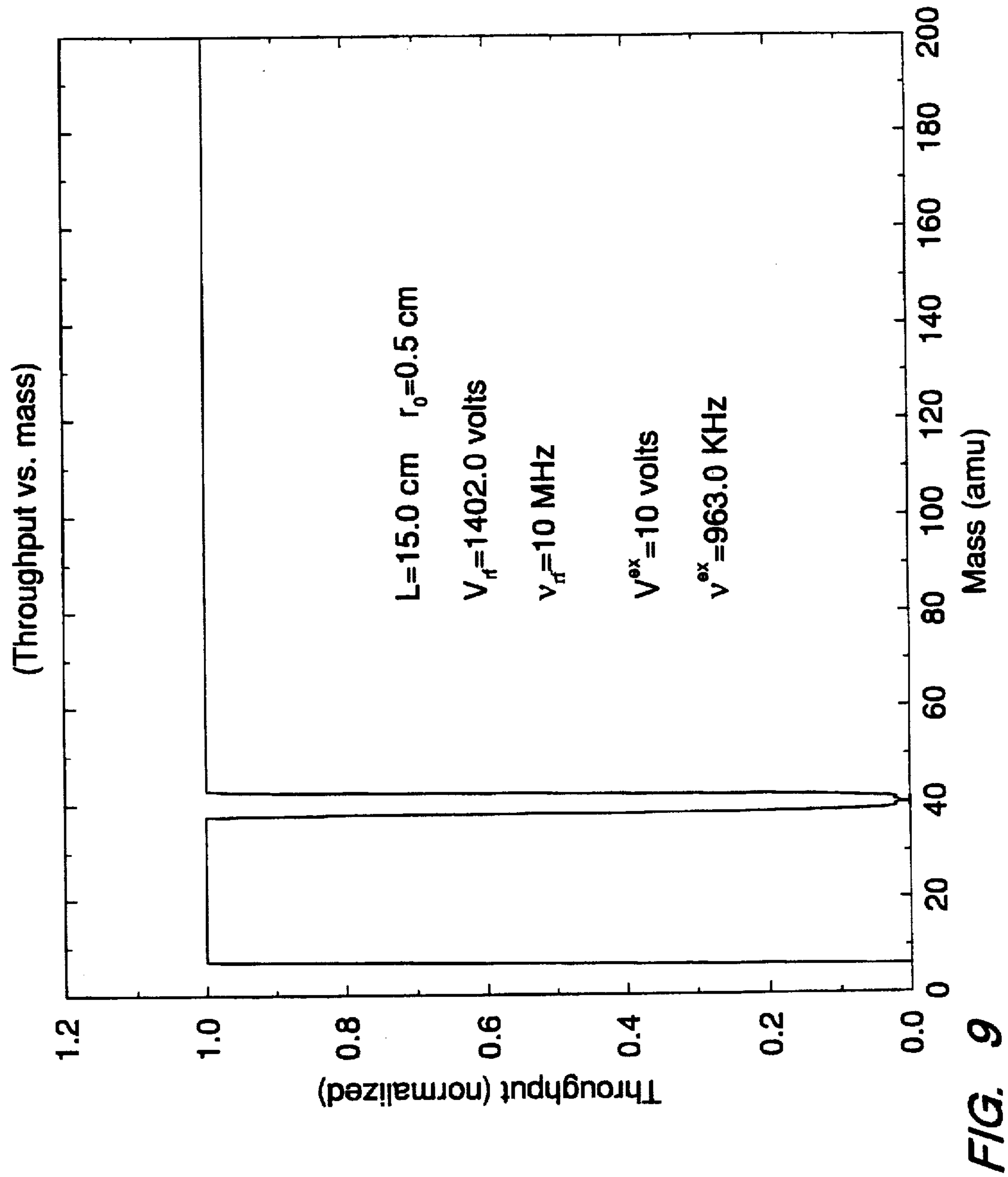
FIG. 9 is a graphical representation of the throughput of a quadrupole notch filter of the present invention showing the excision of an ion species.

$V^{ex}$ is the amplitude of the applied excision field and to $\omega_0$ is the macromotion frequency of the target ion to be "excised." Typical results of simulations of this sort are shown in FIG. 9. This quadrupole notch filter has a length of 15 cm. An excision field which has the frequency appropriate to eliminate ions with mass-to-charge ratio of 40 amu is applied to the quadrupole. The filter provides full transmissions of all ions (except those with specified mass-to-charge ratio of 40 amu) and excellent rejection in the transmission notch. The theoretical description is provided to facilitate the understanding of the present invention. It is understood that the notch filter according to the present invention can be applied based on the present disclosure and does not depend on any particular theory.

Optimization of the Mass Selective Notch Filter

An important parameter to maximize in the notch filter of this invention is the effective length of the filter. A longer interaction time allows the use of weaker excision fields to obtain the same notch depth (target ion rejection). Weaker excision fields yield a notch width that is smaller, since the nonresonant mass-to-charge ratios are less affected during their brief periods of synchronism with the excision fields as they go in and out of phase coherence. Performance is optimized by maximizing the effective length of the MSNF in the following ways:

(1) Maximize the physical length of the quadrupole structure.

Commercial quadrupoles commonly exist with lengths on the order of 15 cm.

(2) Maximize the macromotion frequency. This increases the number of periods over which the excision field can work. This is done by first noting that a constraint is imposed by demanding the mass cut-off of the quadrupole be below the mass range of interest. The mass cut-off expression is obtained from the equation for the aforementioned parameter "q" and the stability diagram in FIG. 2. Since the boundary between stable and unstable trajectories occurs at q=0.909, the mass cut-off is given by $$m_{cut\text{-}off}=\frac{4e}{(0.909)r_0^2\Omega^2}V \tag{17}$$

which fixes the ratio between the amplitude and frequency of the rf voltage to achieve a specific mass cut-off value. Using this relation in the equation for the ion macromotion frequency yields $$\omega_0=0.321\left(\frac{m_{cut\text{-}off}}{m}\right)\Omega. \tag{18}$$

This shows that it is desirable to maximize the rf quadrupole frequency within the mass cut-off constraint to maximize the macromotion frequencies and thus the effective MSNF length.

Figure 10A:
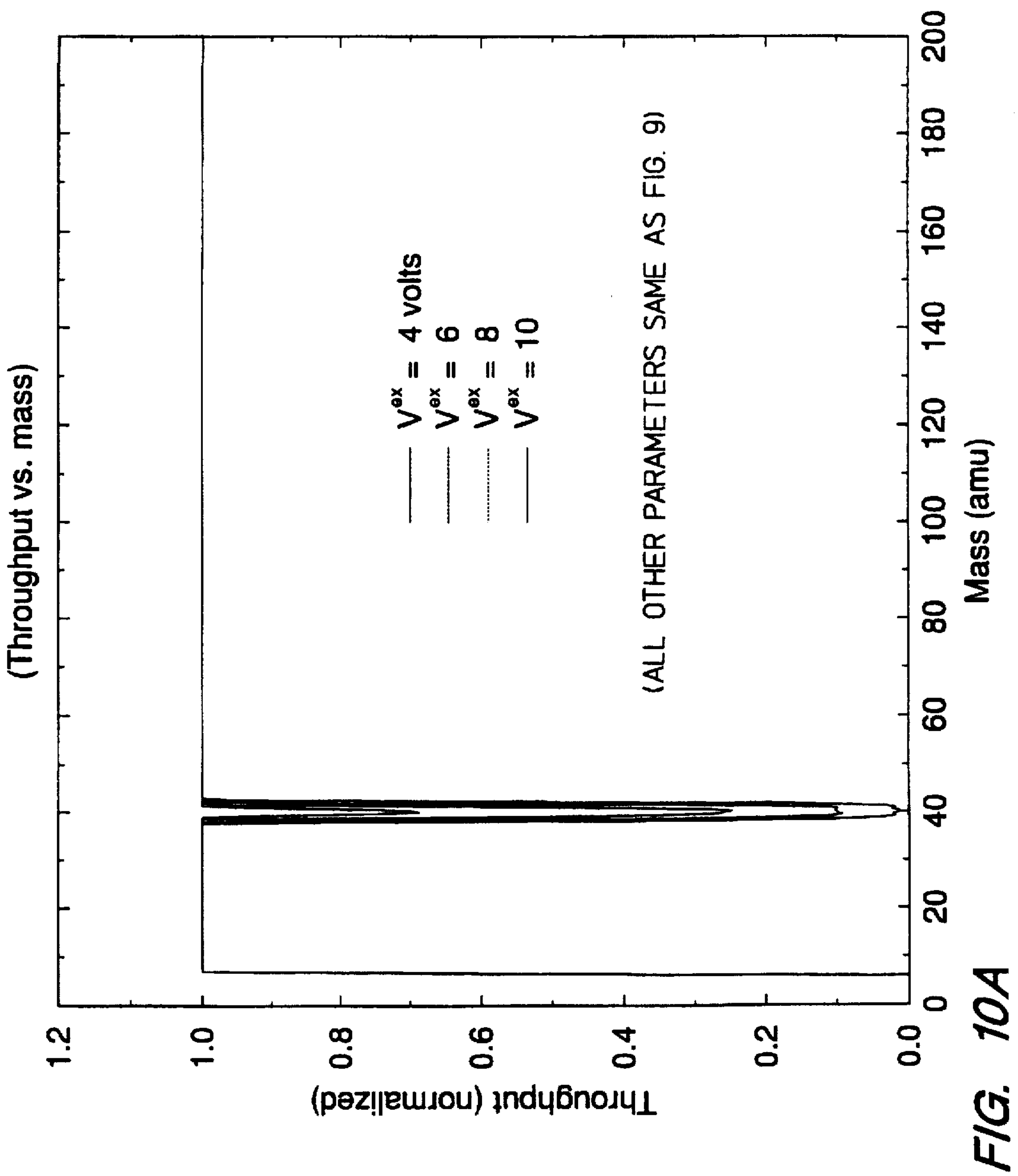
FIG. 10A is a graphical representation of the throughput of a quadrupole notch filter of the present invention showing the excision of an ion species under various excision voltages.
Figure 10B:
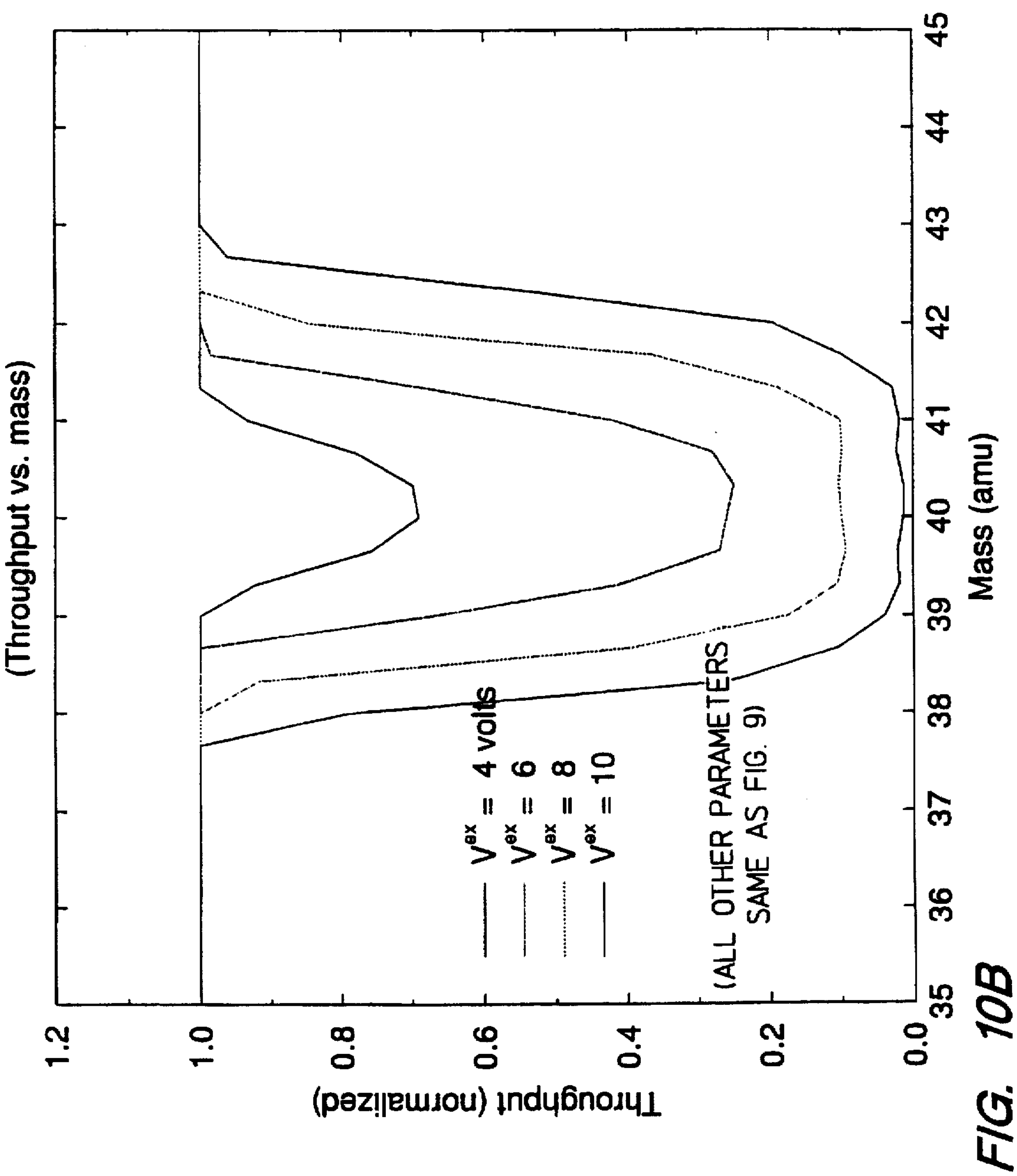
FIG. 10B is a graphical representation of the throughput of a quadrupole notch filter of the present invention showing further details of FIG. 10A.

Once the maximum rf quadrupole frequency achievable is chosen and the macromotion frequency of the target (unwanted) mass-m-charge ratio is computed using the above equations, the excision field can be applied at the second harmonic of the macromotion frequency. The value of the amplitude used for the excision field is chosen to maximize the rejection in the notch, without broadening the width of the notch beyond the allowed one amu (separation from the nearest "non-containing" ion). Typical results of excision efficiency as a function of excision field amplitude are shown in FIGS. 10A, 10B.

Figure 11:
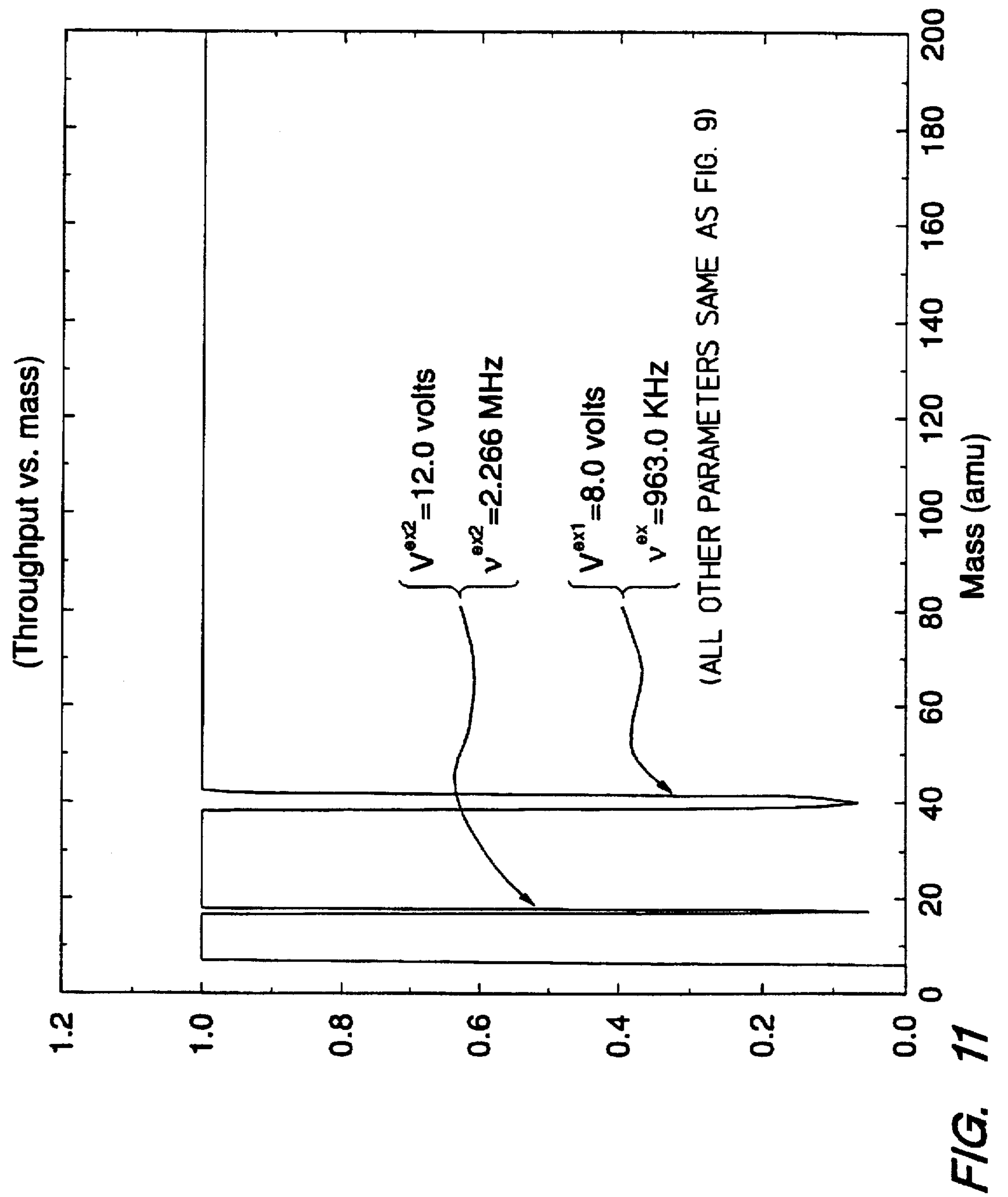
FIG. 11 is a graphical representation of the throughput of a quadrupole notch filter of the present invention showing the excision of two ion species.
Figure 12:
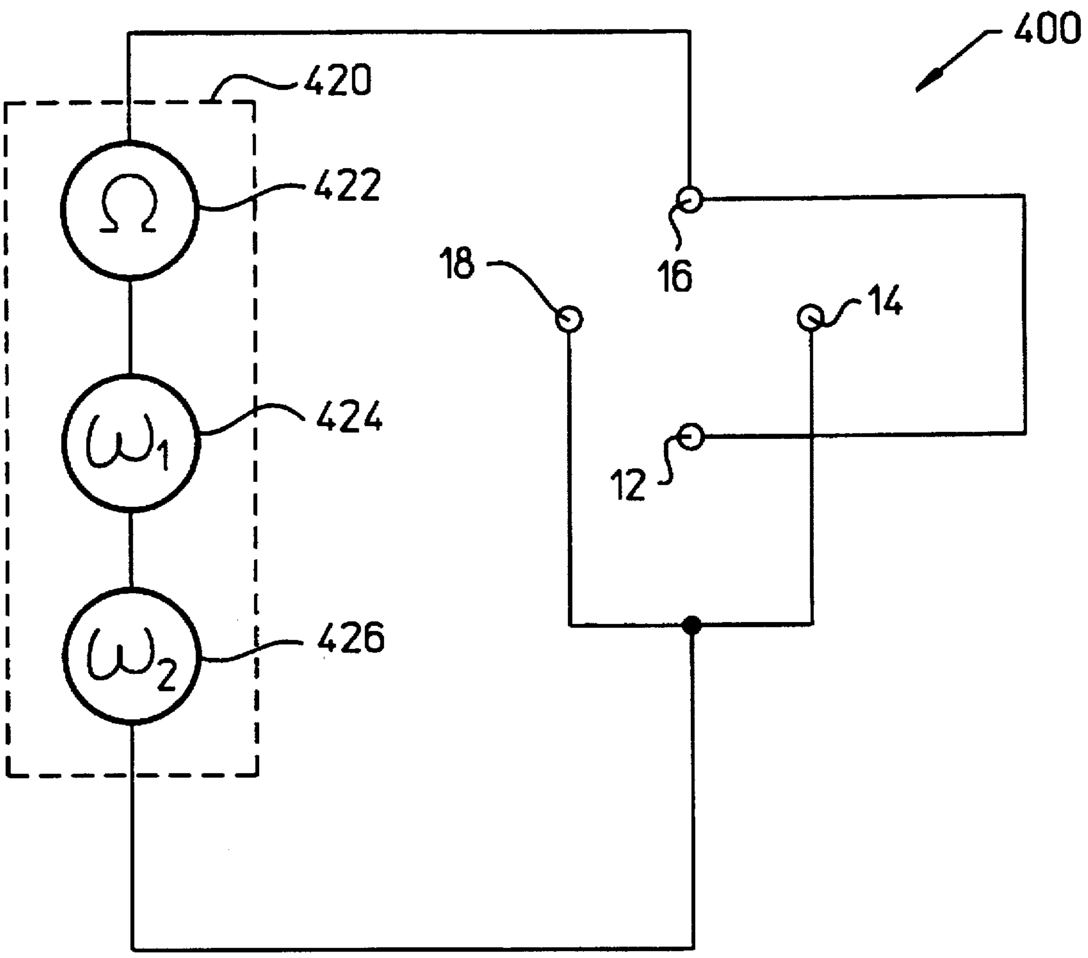
FIG. 12 is a schematic representation of an embodiment of the quadrupole notch filter of the present invention having two notches for the excision of two ion species, using oscillators with frequencies $\omega_1$ and $\omega_2$.

More than one target ion species can be excised simultaneously. In this case, excision fields can be added for each of the targeted contaminant ions, with the excision frequencies corresponding to the second harmonic of each of the individual macromotion frequencies. These excision voltages (of excision frequencies $\omega_1$ and $\omega_2$) are superimposed on the rf quadrupole voltage of frequency $\Omega$. Again, in the power supply equipment 420 of this notch filter (e.g. 400 shown in FIG. 12), a single oscillator, or three oscillators 422, 424, 426, for the frequencies $\Omega$, $\omega_1$ and $\omega_2$ (as shown in FIG. 12) can be used to generate the oscillation waveform. In FIG. 11 the calculated response of a "dual-notch" MSNF is plotted for excision fields targeting mass-to-charge ratios of 17 and 40 amu.

Although the illustrative embodiments of the device of the present invention and the method of using the device have been described in detail, it is to be understood that the above-described embodiments can be modified by one skilled in the art, especially in sizes and shapes and combination of various described features without departing from the spirit and scope of the invention.

What is claimed is:

1. A notch filter for selectively removing a target ion with a specific mass-to-charge ratio from an ion beam, comprising:

(a) a quadrupole having an inlet end and an outlet end, the ion beam can be directed to traverse from the inlet end to the outlet end, the quadrupole having two pairs of parallel electrodes adapted to have opposite polarities in oscillating electrical potential, each pair having two parallel oppositely facing electrodes of equal oscillating electrical potential;

(b) an ion source for emitting an ion beam into the quadrupole;

(c) a power supply for driving the oscillating electrical potential of the quadrupole electrodes, generating an oscillating electrical potential which is a superposition comprising an rf quadrupole frequency component and an excision frequency component, the two parallel electrodes in each pair being positioned opposite to each other and adjacent to the parallel electrodes of the other pair, one pair of electrodes being connected to one pole of the power supply and the other pair of electrodes being connected to the opposite pole of the power supply, such that the rf quadrupole frequency component causes ions of above a selected mass-to-charge ratio to be guided along the quadrupole and the excision frequency component causes the target ion to be removed from the ion beam before exiting the quadrupole, the target ion having a dominant resonant frequency in response to the rf quadrupole frequency component, the excision frequency being the second harmonic of the dominant resonant frequency of the target ion; and (d) a detector for detecting the ions exiting the quadrupole.

2. The notch filter according to claim 1 wherein the power supply has a first oscillator that drives the rf quadrupole frequency component and a second oscillator that drives the excision frequency component.

3. The notch filter according to claim 1 wherein the two parallel electrodes in each pair are in electrical communication without significant impedance therebetween to achieve equal electrical potential.

4. The notch filter according to claim 1 wherein both pairs of parallel electrodes are in electrical communication with the power supply without passing through an auxiliary frequency selective coupling network.

5. The notch filter according to claim 1 wherein the power supply has a first oscillator that drives the rf quadrupole frequency component and a second oscillator that drives the excision frequency component, each oscillator having voltage outlet terminals, the voltage outlet terminals of the two oscillators being connected in series to effect the oscillating electrical potential of the power supply.

6. The notch filter according to claim 1 wherein the power supply is adapted to generate an oscillating electrical potential comprising an rf quadrupole frequency component and at least two excision frequency components superimposed on the rf quadrupole frequency component, such that the at least two excision frequency components cause target ions of at least two mass-to-charge ratios to resonate and be removed from the ion beam before exiting the quadrupole.

7. A method for selectively removing a target ion with a specific mass-to-charge ratio from an ion beam; comprising: driving the electrical potential of four electrodes of a quadrupole as two pairs of opposite polarities with an oscillating voltage which is a superposition comprising a rf quadrupole frequency component and an excision frequency component, the target ion having a dominant resonant frequency in response to the rf quadrupole frequency component, the rf quadrupole frequency being selected to cause ions above a selected mass-to-charge ratio to be guided along the quadrupole, the excision frequency being selected to be twice the dominant resonant frequency of the target ion to cause the target ion to resonate and be removed from the ion beam which is directed to traverse from an inlet end to an outlet end of the quadrupole.

8. The method according to claim 7 wherein the excision frequency is selected such that when the rf quadrupole frequency component drives the target ion in a macromotion having an instantaneous transverse component perpendicular to the parallel electrodes the excision frequency component drives the target ion to augment that instantaneous transverse component.

9. The method according to claim 7 wherein poles opposite each other in the quadrupole have the same electrical potential and differ from that of poles adjacent thereto.

10. The method according to claim 7 further comprising maximizing the number of periods of oscillation that an ion undergoes before exiting the quadrupole.

11. The method according to claim 7 further comprising selecting a cut-off-mass-to-charge ratio and selecting a substantially maximal frequency for the rf quadrupole frequency within constraints of the cut-off mass-to-charge ratio selected.

12. The method according to claim 7 further comprising emitting an ion beam from an ion source.

13. The method according to claim 7 further comprising detecting ions exiting the quadrupole.

14. A method of making a notch filter for selectively removing a target ion with a specific mass-to-charge ratio from an ion beam, comprising:

(a) connecting two parallel electrodes opposite each other as a first pair in a quadrupole to provide electrical communication therebetween and connecting two other parallel electrodes opposite each other as a second pair in the quadrupole to provide electrical communication therebetween; and (b) connecting a power supply to the quadrupole for driving oscillating electrical potential of the quadrupole, the power supply having a first pole with a first polarity and a second pole having a polarity opposite to the first polarity, such that the first pole of the power supply is connected to the first pair of the parallel electrodes and the second pole of the power supply is connected to the second pair of parallel electrodes, wherein the power supply is adapted to generate an oscillating electrical potential which is a superposition comprising an rf quadrupole frequency component and an excision frequency component, such that the rf quadrupole component generates a field to result in ions above a selected mass-to-charge ratio being guided along the quadrupole and the excision frequency component generates a field to result in the target ion being removed from the beam before exiting the quadrupole, such that the target ion has a dominant resonant frequency in response to the rf quadrupole frequency component, and wherein the power supply is adapted to have an excision frequency at twice the dominant resonant frequency of the target ion.

15. A method for selectively removing a target ion with a specific mass-to-charge ratio from an ion beam, comprising:

driving the electrical potential of four electrodes of a quadrupole with an oscillating voltage which is a superposition comprising a rf quadrupole frequency component and an excision frequency component, the rf quadrupole frequency component being provided by a first oscillator and the excision frequency component being provided by a second oscillator, the oscillators being connected in series and to the electrodes in two pairs such that any two oppositely facing electrodes of the quadrupole form a pair having the same electrical potential with each other but oscillatingly different from the electrical potential of the other pair, the rf quadrupole frequency being selected to cause ions above a selected mass-to-charge ratio to be guided along the quadrupole, the excision frequency being selected to cause the target ion to resonate and be removed from the ion beam which is directed to traverse from an inlet end to an outlet end of the quadrupole, while allowing ions above a selected mass-to-charge ratio and different from the mass-to-charge ratio of the target ion to remain in the ion beam traversing through the quadrupole.

* * * * *